(12) United States Patent
Noble et al.

(10) Patent No.: US 10,979,406 B2
(45) Date of Patent: Apr. 13, 2021

(54) STREAMING DIGITAL CONTENT WITH CONTENT METADATA

(71) Applicant: International Business Machines Corporation, Armonk, NY (US)

(72) Inventors: Gary P. Noble, Broadway (GB); Timothy A. Graham, Alresford (GB)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 16/114,274

(22) Filed: Aug. 28, 2018

(65) Prior Publication Data

US 2020/0076778 A1 Mar. 5, 2020

(51) Int. Cl.
*G06F 21/62* (2013.01)
*H04L 29/06* (2006.01)
*H04L 9/06* (2006.01)
*H04L 9/08* (2006.01)
*G06F 21/60* (2013.01)

(52) U.S. Cl.
CPC ........ *H04L 63/0457* (2013.01); *G06F 21/602* (2013.01); *H04L 9/0625* (2013.01); *H04L 9/0861* (2013.01); *H04L 65/601* (2013.01)

(58) Field of Classification Search
CPC ............... H04L 65/601; H04L 65/4076; H04L 65/4084; H04L 9/0618; H04L 65/607; G06F 21/60
See application file for complete search history.

(56) References Cited

U.S. PATENT DOCUMENTS

| 7,242,772 B1 | 7/2007 | Tehranchi |
| 2005/0190911 A1* | 9/2005 | Pare ........................ H04L 9/065 380/30 |
| 2010/0172498 A1 | 7/2010 | Malcolm et al. |
| 2012/0020475 A1 | 1/2012 | Altmann |
| 2014/0226814 A1 | 8/2014 | Fernando |
| 2015/0055776 A1 | 2/2015 | Taylor et al. |
| 2016/0028787 A1 | 1/2016 | Pare et al. |
| 2017/0034554 A1* | 2/2017 | Tang .................. H04N 21/4331 |
| 2019/0109713 A1* | 4/2019 | Clark .................... H04L 9/3239 |

OTHER PUBLICATIONS

Noble et al., "Streaming Digital Content With Content Metadata", U.S. Appl. No. 16/515,338, filed Jul. 18, 2019.
List of IBM Patents or Patent Applications Treated as Related, Jul. 18, 2019, 2 pages.

(Continued)

*Primary Examiner* — Olugbenga O Idowu
(74) *Attorney, Agent, or Firm* — Scott S. Dobson

(57) ABSTRACT

Methods and systems are provided for streaming digital content. A content stream and metadata relating to the content stream are provided, and the content stream is encrypted with an encryption dependent on at least some of the metadata to provide an encrypted content stream. The metadata is embedded in readable form in the encrypted content stream and the encrypted content stream is transmitted together with the metadata in readable form such that the metadata is readable during transmission of the encrypted content stream and the readable metadata necessary for use in decryption of the encrypted content stream is provided.

11 Claims, 12 Drawing Sheets

(56) References Cited

OTHER PUBLICATIONS

Yang et al., "Data-image-video encryption", Published in: IEEE Potentials, vol. 23, Issue 3, Date of Publication: Oct. 18, 2004, 7 pages.
"Video Streaming| Encrypted Video Streaming", http://blog.rsaplay.com/, Dec. 8, 2017, 10 pages, Copyright © Video Streaming| Encrypted Video Streaming.
"Block cipher", Wikipedia, https://en.wikipedia.org/wiki/Block_cipher, printed Mar. 27, 2018, 14 pages.
Mell et al., "The NIST Definition of Cloud Computing", Recommendations of the National Institute of Standards and Technology, Sep. 2011, U.S. Department of Commerce, 7 pages.

* cited by examiner

STREAMING DIGITAL CONTENT WITH CONTENT METADATA

BACKGROUND

The present invention relates to streaming digital content and, more specifically, streaming digital content with content metadata while maintaining the integrity of the content metadata.

With digital streaming technology becoming more prevalent, suppliers of data have to protect their data source and usually encrypt the data being streamed. Typically, an encrypted digital stream is transmitted from supplier to end user through an insecure channel of an eco-system of a series of Internet Service Providers (ISPs). As the channel is insecure, the ISPs do not have access to the data as encrypted data by its very nature does not have the ability to carry any visible data. Therefore, ISPs are unable to gain insight of the content of the encrypted data.

SUMMARY

According to an aspect of the present invention there is provided a computer-implemented method for streaming digital content, comprising: providing a content stream and metadata relating to the content stream; encrypting the content stream with an encryption dependent on at least some of the metadata to provide an encrypted content stream; embedding the metadata in readable form in the encrypted content stream; and transmitting the encrypted content stream together with the metadata in readable form such that the metadata is readable during transmission of the encrypted content stream and the readable metadata necessary for use in decryption of the encrypted content stream is provided.

According to another aspect of the present invention there is provided computer-implemented method for streaming digital content, comprising: receiving a transmitted encrypted content stream together with metadata in readable form enabling reading of the metadata during transmission; extracting the metadata in readable form to provide extracted metadata for use in decryption; decrypting the encrypted content stream with a decryption being dependent on at least some of the readable form of the metadata; and outputting a content stream of content associated with verified metadata.

According to a further aspect of the present invention there is provided a system for streaming digital content, comprising: a processor and a memory configured to provide computer program instructions to the processor to execute the function of components including: a content stream providing component providing a content stream and a metadata providing component for providing metadata relating to the content stream; an encryption engine for encrypting the content stream with an encryption dependent on at least some of the metadata to provide an encrypted content stream; and an embedding component for embedding the metadata in readable form in the encrypted content stream; and a transmitting component for transmitting the encrypted content stream together with the metadata in readable form such that the metadata is readable during transmission of the encrypted content stream and the readable metadata necessary for use in decryption of the encrypted content stream is provided.

According to a further aspect of the present invention there is provided system for streaming digital content, comprising: a processor and a memory configured to provide computer program instructions to the processor to execute the function of components including: a receiving component for receiving transmitted encrypted content stream together with the metadata in readable form enabling reading of the metadata during transmission; an extraction component for extracting the metadata in readable form to provide extracted metadata for use in a decryption engine; a decryption engine for decrypting the encrypted content stream with a decryption being dependent on at least some of the readable form of the metadata; and a content output component for providing a content stream of content associated with verified metadata.

According to a further aspect of the present invention there is provided a computer program product for streaming digital content, the computer program product comprising a computer readable storage medium having program instructions embodied therewith, the program instructions executable by a processor to cause the processor to: provide a content stream and metadata relating to the content stream; encrypt the content stream with an encryption dependent on at least some of the metadata to provide an encrypted content stream; embed the metadata in readable form in the encrypted content stream; and transmit the encrypted content stream together with the metadata in readable form such that the metadata is readable during transmission of the encrypted content stream and the readable metadata necessary for use in decryption of the encrypted content stream is provided.

According to a further aspect of the present invention there is provided a computer program product for streaming digital content, the computer program product comprising a computer readable storage medium having program instructions embodied therewith, the program instructions executable by a processor to cause the processor to: receive a transmitted encrypted content stream together with metadata in readable form enabling reading of the metadata during transmission; extract the metadata in readable form to provide extracted metadata for use in decryption; decrypt the encrypted content stream with a decryption being dependent on at least some of the readable form of the metadata; and output a content stream of content associated with verified metadata.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present disclosure will now be described, by way of example only, with reference to the following drawings in which.

Figure 1A:
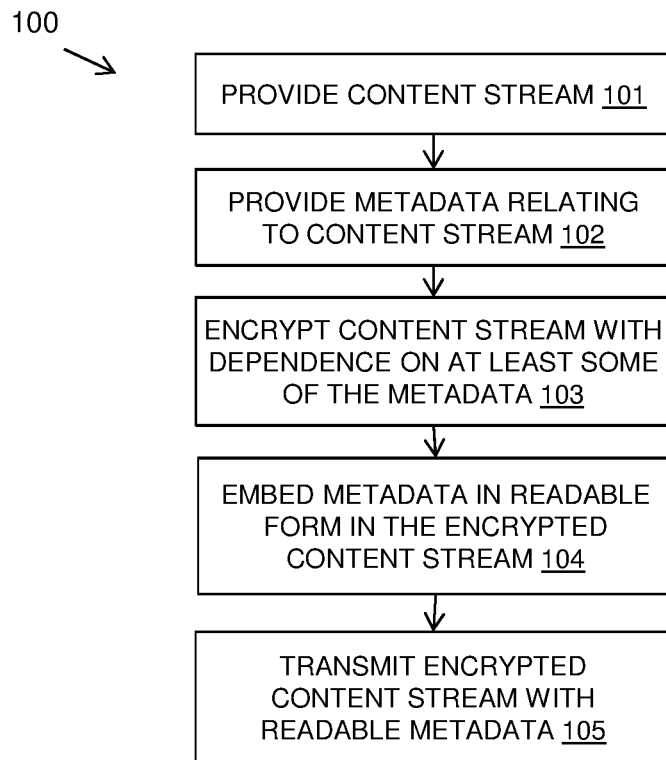
FIGS. 1A and 1B are flow diagrams of example embodiments of encryption and decryption aspects of a method in accordance with the present disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

There an opportunity for fraudsters to take a paid-for stream of digital data and then forward it on many times, charging the users a small cost for the illegal copy. Further, some authorities want to know what is in a data stream without decrypting it.

The challenge is to help the eco-system of ISPs identify content while still providing encryption. ISPs may be able to spot traffic patterns but otherwise they have limited visibility of the content. It is therefore advantageous for ISPs to have visibility about more aspects of the encrypted data stream whilst maintaining security integrity. This would enable an ISP to know what an encrypted data stream relates to, for example, it might be a live football match with licensing considerations.

If plain text metadata is included with the encrypted data stream providing information about the encrypted data stream, a fraudster can merely replace the existing metadata with their own metadata, passing the stream off as their own.

The described method and system provide a digital content stream that is sent securely in encrypted form from a transmitting system to a receiving system. The digital content stream has associated metadata relating to the content that is readable during transmission of the digital content stream in order for parties handling the transmission and receipt to identify the content of the digital content stream.

The digital content stream may include media such as video and/or audio data that may be transferred at a steady high-speed rate. The digital content stream may be transmitted by a provider and received and presented to an end-user for playing using a media player. Live streaming is the delivery of content in real time via a network such as the Internet. A content delivery network may distribute and deliver the content.

The encryption of the digital content stream is carried out by an encryption process that is dependent on at least part of the readable metadata thereby binding the encrypted content with the readable metadata in order to prevent tampering with the readable metadata.

The encrypted content stream may include the readable metadata as a plain text component which is required to be present for successful decryption of the encrypted content stream. If the plain text is removed from the data stream or altered, the decryption cannot complete, as the encrypted data is dependent on the content metadata. The plain text component may be provided at intervals in the encrypted content stream. As an alternative to the content metadata being provided as a plain text component, the content metadata may be provided as an image or computer readable component.

A content provider may transmit a secure content stream and provide content metadata for an ISP eco-system to identify the content without the need to decrypt the secure content stream.

Figure 1B:
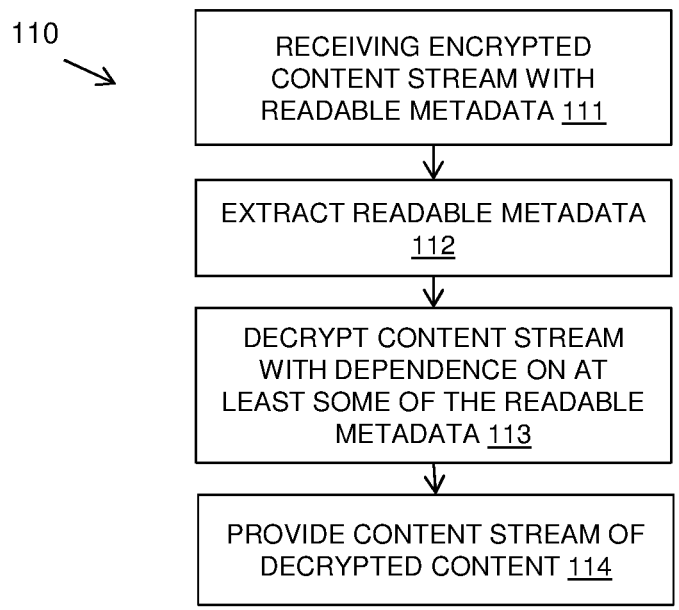

Referring to FIGS. 1A and 1B, flow diagrams 100, 110 illustrate example embodiments of the described method as carried out at a content stream transmitter system and at a content stream receiver system.

FIG. 1A shows an example method at a content stream transmitter system. A content stream may be provided 101 with metadata provided 102 relating to the content stream. The metadata may be associated with descriptive information about the digital data, such as content provider information, content description, licensing information, etc.

The content stream may be provided in an already encrypted form (in which case a double encryption may result) or in a form ready for encryption. The provision of metadata may be carried out separately from an initial encryption of the content stream, in which case, the provided content stream may be an encrypted content stream.

The method may encrypt 103, or further encrypt if the content is already in encrypted form, the content stream with the encryption being dependent on at least some of the metadata. The encryption may be dependent on the entire metadata, for example, by incorporating the metadata into the content stream. Alternatively, the encryption may be dependent on only part of the metadata, such as a defined length of data that is required for the reading and intelligibility of the metadata. The resultant encrypted content stream that is transmitted is reliant on the metadata.

The encryption in a form dependent on at least some of the metadata may be carried out by a variety of methods. In one embodiment, the metadata may be provided in the data encryption cycle, and the encrypted data is dependent on the incorporated metadata. This method may incorporate the metadata throughout the content stream and therefore no part of the content stream may be extracted. An example embodiment of a data encryption cycle method is a block cipher that encrypts block by block, with encryption of any block depending on a previous block.

In another embodiment, the metadata or a portion of the metadata may be incorporated into a secret key used for the encryption such that decryption is only possible if the metadata is correspondingly incorporated into a secret key used for decryption. As the metadata will be public, some form of salt or random data may be required as additional input to provide added defense to the encryption.

The metadata in readable form, referred to as public metadata, may be embedded 104 in the encrypted content stream.

The public metadata may be provided at intervals in the encrypted content stream such that it is available during transmission if only part of the stream is intercepted. The skilled person would understand that the term "readable" would mean that the metadata is made public during transmission of the encrypted content stream in a manner in which it is intelligible to third parties. The readable form may be human readable, such as a plain text or an image, or computer readable. If the readable form is computer readable, it may be translatable into human readable form by any interested third parties.

The public metadata may be the same metadata repeated at intervals in the encrypted content stream or may comprise several different sections of metadata each including different metadata. For example, a first section with a description of the content, a second section with provider information, and a third section with licensing information, with the three sections repeating in a cycle in the encrypted content stream. In a further option, the public metadata may change as it is provided at intervals in the encrypted content stream. The intervals may be regular or varied in the encrypted content stream.

In an embodiment in which the metadata is included in the data encryption cycle, the encrypted metadata may be provided in the encrypted stream in addition to the public metadata to provide a data stream comprising encrypted content data, encrypted metadata and public metadata. Alternatively, the encrypted metadata may be replaced by the public metadata to provide a data stream comprising encrypted content data and public metadata.

The method may transmit 105 the encrypted content stream together with the public metadata in readable form. In this way, the metadata is readable during transmission of the encrypted content stream by interested parties and the public metadata necessary for use in decryption of the encrypted content stream is provided. The encrypted content stream is fatally compromised if the public metadata is removed or replaced as it will not be able to be decrypted.

FIG. 1B shows an example method at a content stream receiver system. An encrypted content stream may be received 111 with readable metadata relating to the content stream.

The readable metadata may be extracted 112 from the received stream for use in the decryption method. Depending how the metadata was incorporated into the encryption method, the extraction may remove the metadata from the received stream or may read it whilst leaving it available in the stream for decryption purposes before removing it.

The method may decrypt 113 the encrypted content stream in a manner dependent on the extracted readable metadata.

In an embodiment in which the metadata is included in the data encryption cycle, and the encrypted metadata is provided in the encrypted stream in addition to the public metadata, the decrypted metadata may be compared to the public metadata and both the decrypted metadata and the public metadata removed from the stream before use of the stream.

In an embodiment in which the metadata is included in the data encryption cycle, and the encrypted metadata has been replaced by the public metadata, the public metadata may remain in the encrypted content stream for use in the decryption until the decryption has been completed and then it may be removed from the stream. The public metadata may be encrypted to provide the encrypted metadata, which was previously replaced by the public metadata, for use in the decryption.

In an alternative embodiment in which the metadata or some of the metadata is incorporated into a secret key used for encryption, the decryption method may use a corresponding incorporation of the extracted public metadata or part of it into a secret key for decryption.

The content stream of decrypted content with the metadata removed may be output 114. The decrypted content may require further decryption if the originally provided content stream in the method of FIG. 1 was in encrypted form.

Figure 2:
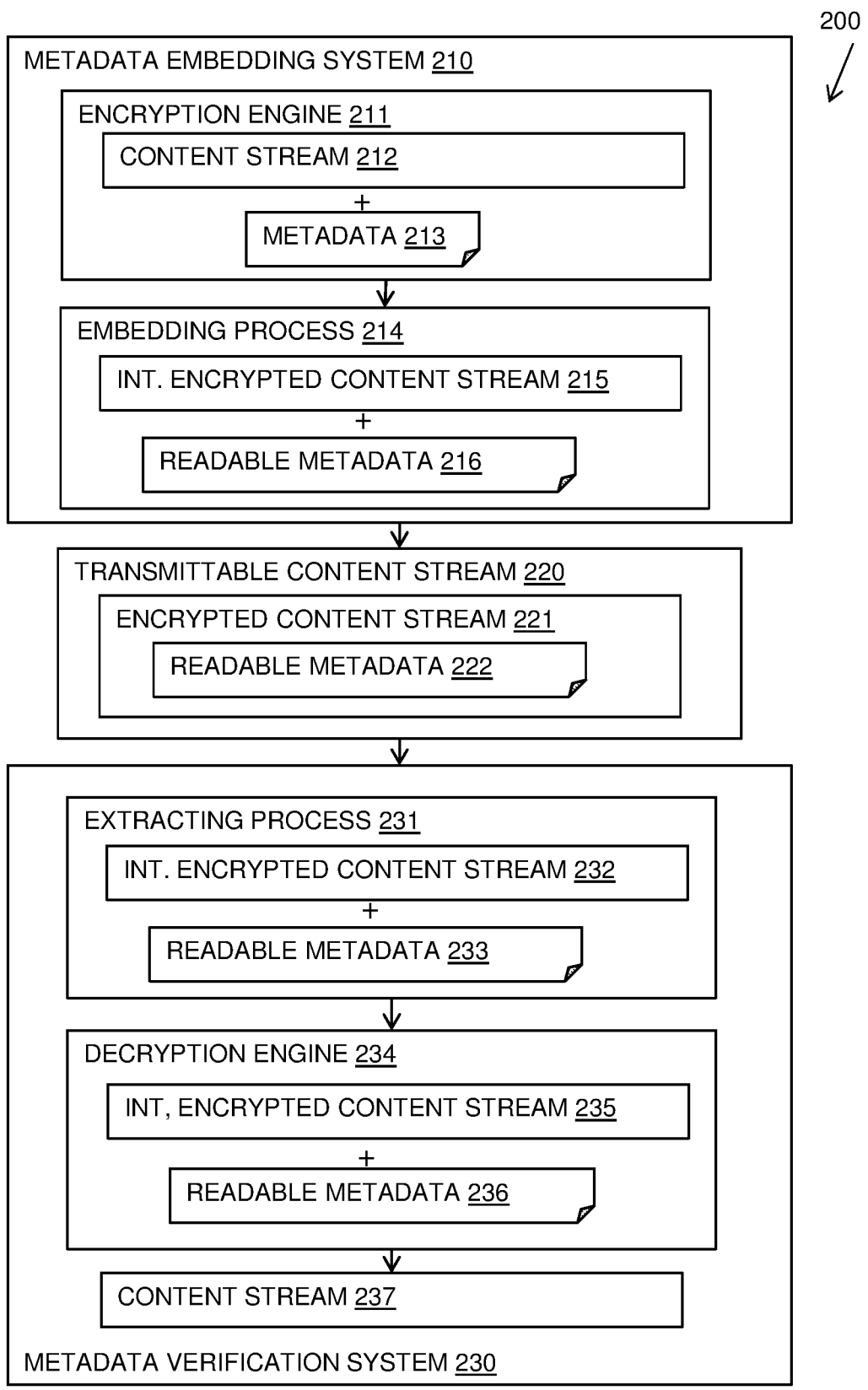
FIG. 2 is schematic diagram illustrating an example embodiment of a method in accordance with the present disclosure.

Referring to FIG. 2, a schematic diagram 200 illustrates an example embodiment of the described method and system.

A metadata embedding system 210 is shown that may be provided at a content stream transmitter system. A metadata verification system 230 is shown that may be provided at a content stream receiver system.

The metadata embedding system 210 may include an encryption engine 211 for encryption of a content stream 212 based on metadata 213 relating to the content stream. This may result in an intermediate encrypted content stream 215. Based on the method of encrypting, the intermediate data stream 215 may comprise encrypted content data that is dependent on the metadata and may also include encrypted metadata.

The intermediate data stream 215 may be combined with readable metadata 216 by an embedding process 214 to produce a transmittable content stream 220 formed of an encrypted content stream 221 with embedded readable metadata 222. The encryption engine 211 and the embedding process 214 may be carried out simultaneously or in a consecutive manner.

The transmittable content stream 220 formed of the encrypted content stream 221 with embedded readable metadata 222 is transmitted with the metadata available to be read during transmission and on receipt at a receiving system.

The metadata verification system 230 may carry out an extraction process 231 to extract the readable metadata 233 from the encrypted content stream to revert to the intermediate encrypted content stream 232. A decryption engine 234 may decrypt the intermediate content stream 235 using the readable metadata 236 to output the content stream 237.

Figure 3:
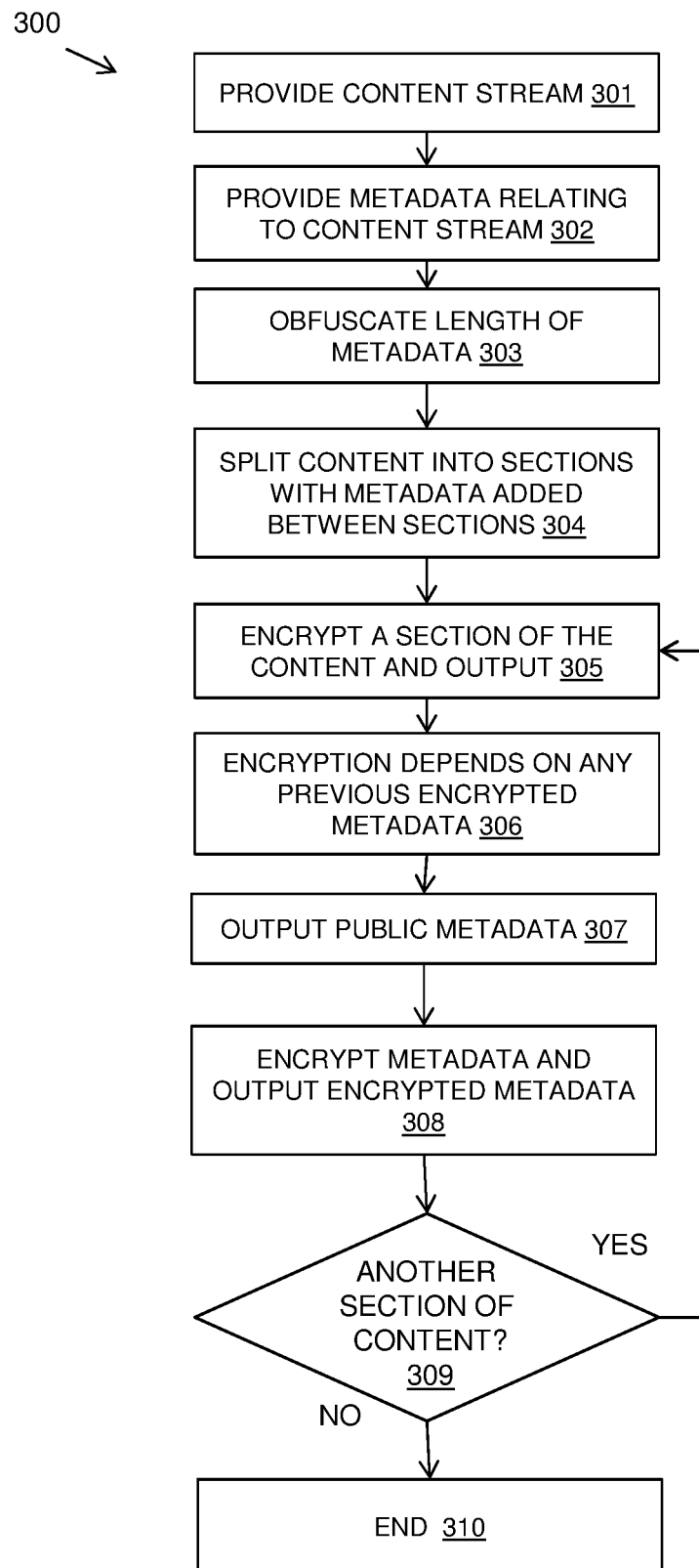
FIG. 3 is a flow diagram of an example embodiment of an encryption aspect of a method in accordance with the present disclosure.

Referring to FIG. 3, a flow diagram 300 shows a specific example embodiment of the method of FIG. 1A in which the encryption is dependent on metadata by including the metadata in the data encryption cycle using a block cipher encryption.

A content stream is provided 301 as well as metadata provided 302 relating to the content stream. In order to prevent removal of the metadata, the metadata may be obfuscated 303 by methods such as by disguising the start and end markings, the length of the metadata, and which bits are real metadata. For example, the metadata may have additional random data appended to obfuscate 303 the length of the metadata.

The encryption process may split 304 the content data into sections with content metadata added between the sections to result in some secret sections (for example, the video content) and some public sections (the readable content metadata). The content metadata may be repeated a number of times and interspersed in a regular or irregular arrangement throughout the content stream.

The encryption process may use a secret key and a block cipher that encrypts the sections block by block with encryption of any block depending on previous block.

A section of the secret data is encrypted 305 and sent to the output. If there is a previous section, the encryption depends 306 on any previous section. For a first section, there is no previous encrypted metadata and so the encryption does not depend on the metadata but may depend on an Initialization Vector (IV) in the form of an initializing data block.

A section of public metadata is then output 307 as plain text to the output, followed immediately by the same metadata encrypted by the block cipher to provide encrypted metadata 308 that is sent to the output.

The method may loop to encrypt additional secret data sections by determining 309 if there is another section of content.

If there is another section, the method loops to encrypt 305 the section of the secret content and send it to the output. There is now a previous encrypted metadata section that the encryption 305 depends on. The method continues to repeat to again output 307 the public metadata as plain text to the output, followed immediately by the encrypted metadata 308 that is sent to the output.

The method may loop to encrypt additional secret data sections by determining 309 if there is another section of content.

If there are no more sections of secret content, the method may end 310 with the method having output the encrypted content dependent on metadata with embedded public metadata.

Figure 4:
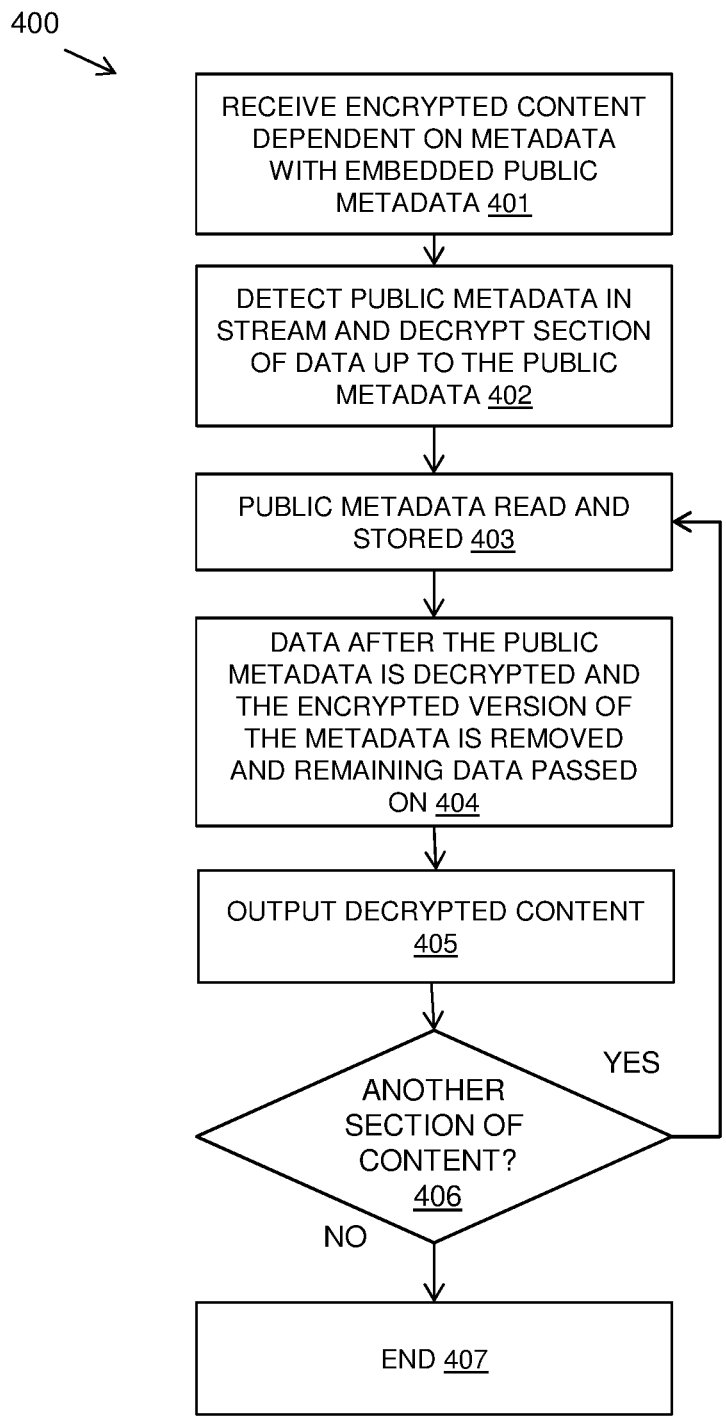
FIG. 4 is a flow diagram of an example embodiment of a decryption aspect of a method in accordance with the present disclosure.

Referring to FIG. 4, a flow diagram 400 shows a specific example embodiment of the decryption method of FIG. 1B and which corresponds to the encryption method of FIG. 3.

The method may receive 401 the encrypted content dependent on metadata with embedded public metadata as streamed to the destination. Observers may see encrypted data with portions of public metadata embedded that can be read.

The method may detect 402 the public metadata in the stream (for example, it may have a start delimiter) and the data up until the public metadata may be decrypted 402 using a secret key. The public metadata may be read and stored 403 for use in the decryption.

The data after the public metadata may be decrypted 404. The decryption of sections of content is dependent on previous sections of metadata. The metadata may be public metadata in plain text that is encrypted and used in the block cipher to decrypt the current section of content. Alternatively, the previous block of encrypted metadata may be used in the decryption of the current section of content and the decrypted metadata may also be compared to the plain text metadata to ensure that the plain text metadata has not been tampered with. In both cases, the metadata is then removed. The decrypted content may be output 405 as it is obtained.

It is then determined 406 if there is another section of content. If so, the method may repeat to read the public metadata 403 and decrypt the next section. If there are no more sections of content, the method may end 407.

A number of alternative variations are possible. In an alternative embodiment, the encrypted metadata sections may be removed before transmission leaving just the encrypted secret data sections and the public metadata. The decryption then uses the public metadata, without needing to decrypt it, when decrypting the secret sections dependent on it due to the block cipher.

In all embodiments, the public unencrypted metadata is included somewhere in the output stream alongside the encrypted content data, and the encrypted content data is dependent on the public metadata.

Therefore, if the public metadata is removed or altered the decryption engine will not be able to identify and decrypt the encrypted version in the stream thus corrupting the remaining data stream. This in effect forces the metadata to be carried with the content. To further obfuscate the public aspect some random data may be added to the end of the public metadata.

A block cipher is a method of encrypting data in which the data is divided into equally sized blocks. A cryptographic key and algorithm are applied to each block of data as a group. The mode of operation repeatedly applies a cipher's single block operation to securely transform large amounts of data. An Initialization Vector (IV) is a unique binary sequence that is used to ensure distinct encryptions of data encrypted with a cryptographic key. Many block ciphers provide methods in which subsequent blocks are dependent on previous blocks of encrypted data providing dependency through a data stream. Various types of block cipher providing this function are known including Cipher Block Chaining (CBC), Propagating Cipher Block Chaining (PCBC), Cipher Feedback (CFB), and Output Feedback (OFB).

As an example, CBC provides a method in which each block of data has an Exclusive OR (XOR) operation applied with the previous encrypted block before being encrypted. This way each block depends on all the data blocks processed up to that point.

Figure 5:
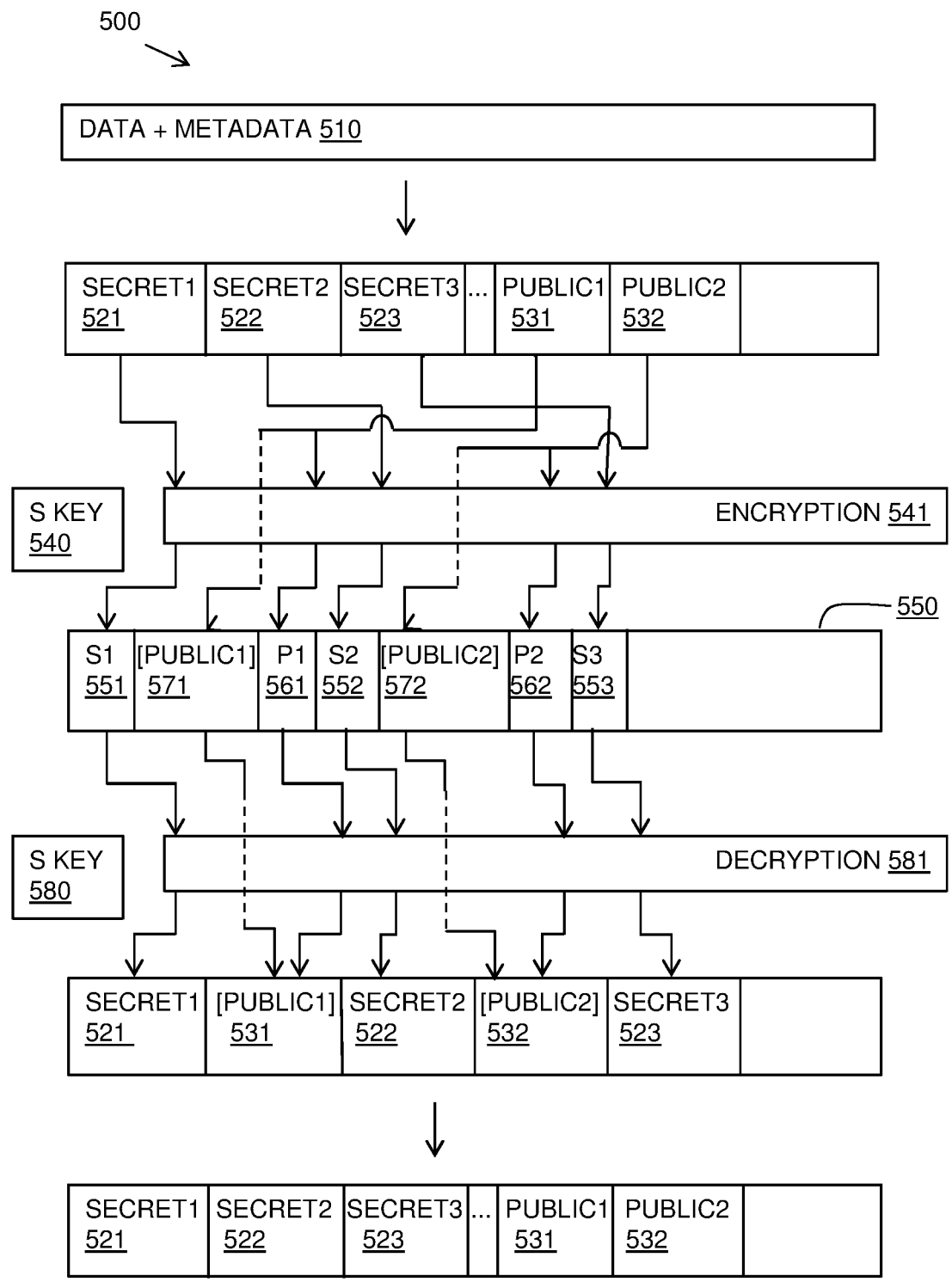
FIG. 5 is a schematic diagram illustrating a more detailed example embodiment of a method in accordance with the present disclosure.

Referring to FIG. 5, a schematic diagram 500 illustrates a specific embodiment of the described method depicting encryption of content data and metadata using a block cipher method of encryption and decryption. In FIG. 5, a limited number of blocks are shown to illustrate the method. In practice, the method repeats with a high number of blocks.

In the described method, content data and metadata 510 may be provided and split into sections of content referred to as "secret" and sections of metadata referred to as "public". The notation used is that when "secret" and "public" are written in full (e.g. SECRET1) then this can be considered plain text content, and when represented by just a single letter (e.g. S1) this is the corresponding encrypted value.

There are three blocks of data shown, SECRET1 521, SECRET2 522, SECRET3 523 and two blocks of metadata PUBLIC1 531, PUBLIC2 532. These are encrypted using a secret key (SKey) 540 and the encryption process 541 is illustrated.

SECRET1 521 is encrypted into S1 551, SECRET2 522 is encrypted into S2 552, SECRET3 523 is encrypted into S3 553, and so forth. PUBLIC1 531 is encrypted into P1 561 as well as being added in plain text form [PUBLIC1] 571, PUBLIC2 532 is encrypted into P2 562 as well as being added in plain text form [PUBLIC2] 572, and so forth. In a block cipher, S2 552 is dependent on previous block P1 561 making it dependent on the metadata. Similarly, S3 553 is dependent on previous block P2 562, and so forth.

The output stream 550 is represented as S1 551, [PUBLIC1] 571, P1 561, S2 552, [PUBLIC2] 572, P2 562, S3 553. Clearly, other combinations of SN, PUBLICN, [PUBLICN] may be considered. In other variations, [PUBLICN] may be inserted somewhere else other than immediately before PN, thereby obfuscating where PN is in the output stream 550.

The output stream is decrypted using a secret key (SKey) 580 and the decryption process is illustrated by block 581. The secret encryption and decryption keys may be a linked key pair as known in many different cryptographic processes.

The decryption process 581 requires the [PUBLICN] to be intact to be used in the decryption to be compared to the decrypted PN. If it is the same, then PUBLICN can be ignored during the ensuing decryption of the next data block.

PUBLICN is identified as being the public metadata by a successful comparison, or by delimiters. In order to identify where encrypted metadata corresponding to public metadata resides, a decrypted P1 may be compared to the public PUBLICN. Alternatively, a delimiter may provide a digital signature that signifies that the following part of the stream is not to be decrypted, as it is the public metadata.

A corruption of PUBLICN can be spotted by a poor comparison and/or checksums in the stream. The order of the encryption/decryption needs to be preserved The decryption process 581 returns the original blocks of data, SECRET1 521, SECRET2 522, SECRET3 523 interspersed with the blocks of metadata PUBLIC1 531, PUBLIC2 532. The metadata PUBLIC1 531, PUBLIC2 532 may be separated out to provide the content stream of SECRET1 521, SECRET2 522, SECRET3 523 that may be streamed at the receiver.

Figure 6A:
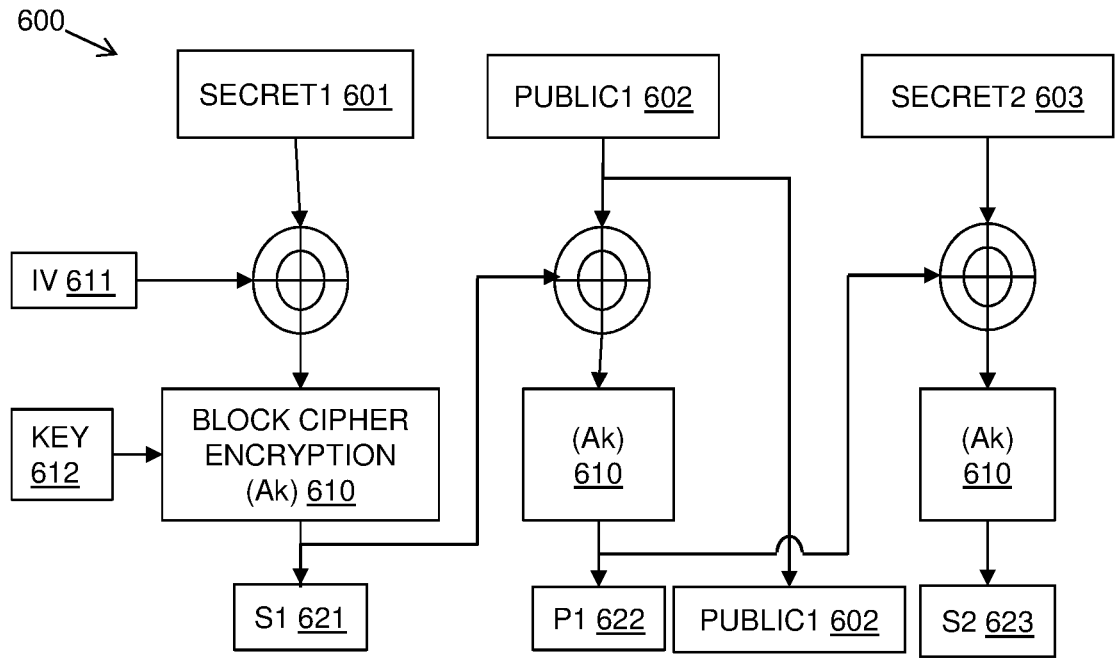
FIGS. 6A and 6B are schematic diagrams illustrating further details of aspects of an example embodiment of a method in accordance with the present disclosure.
Figure 6B:
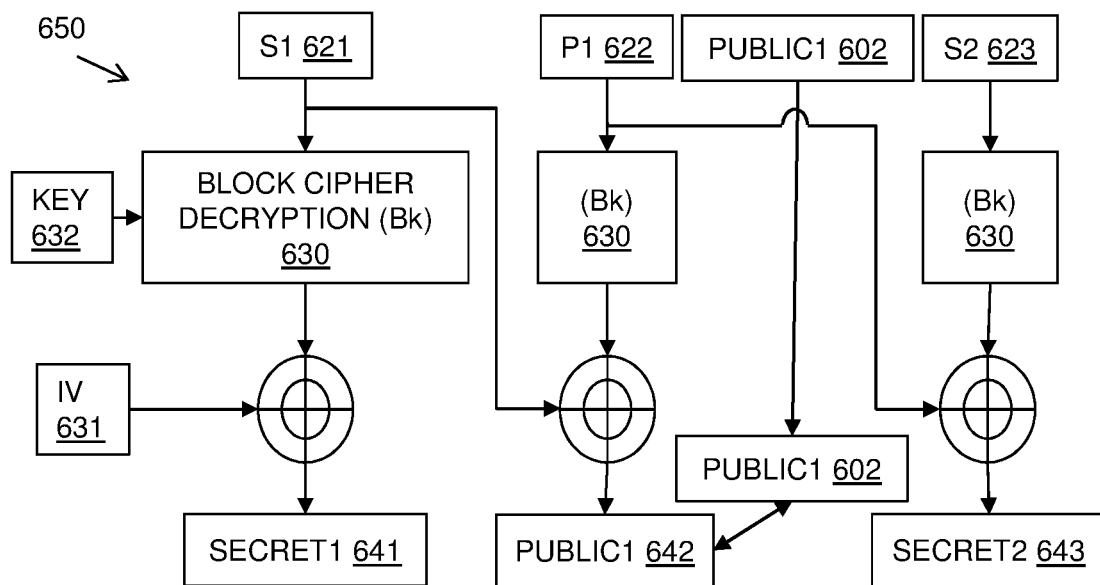

Referring to FIGS. 6A and 6B, schematic diagrams illustrate aspects of an example embodiment of the described method in which a block cipher is used and in which the encrypted metadata is transmitted as well as the public metadata. Again, a limited number of blocks are shown to illustrate the method. In practice, the method repeats with a high number of blocks.

FIG. 6A illustrates the example encryption method 600 using a block cipher. Let the initial content stream=<SECRET1 SECRET2>, with metadata PUBLIC1.

The method interleaves the metadata PUBLIC1 in the content stream to make <SECRET1 (601) PUBLIC1 (602) SECRET2 (603)>.

Using a block cipher encryption 610 (Ak), with an Initialization Vector 611 (IV) and key 612. <SECRET1 (601) PUBLIC1 (602) SECRET2 (603)> is encrypted to <S1 (621) P1 (622) S2 (623)>.

SECRET1 encrypted to S1 (based on IV and SECRET1).
  S1=Ak (SECRET1 $\oplus$ IV)
PUBLIC1 encrypted to P1 (based on S1 and PUBLIC1).
  P1=Ak (PUBLIC1 $\oplus$ S1)
SECRET2 encrypted to S2 (based on P1 and SECRET2).
  S2=Ak (SECRET2 $\oplus$ P1)

The readable metadata PUBLIC1 602 is interleaved to create a transmitted stream <S1 (621) P1 (622) PUBLIC1 (602) S2 (623)>.

FIG. 6B illustrates the example decryption method 650 using a block cipher. The transmitted stream <S1 (621) P1 (622) PUBLIC1 (602) S2 (623)> is received.

The transmitted stream is decrypted using a block cipher decryption 630 (Bk), with an Initialization Vector 631 (IV) and key 632.

S1 decrypted to SECRET1 (based on IV and S1).
  SECTRET1=Bk (S1 $\oplus$ IV)
P1 decrypted to PUBLIC1 (based on S1 and P1).
  PUBLIC1=Bk (P1 $\oplus$ S1)
Identify next block as PUBLIC1 too, either due to delimiters, or by seeing that P1 (the previous encrypted block) is decrypted to the same value PUBLIC1. Therefore ignore PUBLIC1 in the decryption stream.
S2 decrypted to SECRET2 (based on P1 and S2).
  SECTRET2=Bk (S2 $\oplus$ P1)
PUBLIC 1 642 is removed from the stream to produce useable stream <SECRET1 (641) SECRET2 (643)>.

If PUBLIC1 602 is corrupted, an error will arise as the decrypted P1 (PUBLIC1 642) will not compare with it, or the delimiters will not be found.

In other variations PUBLIC1 may be inserted somewhere else other than immediately after P1, thereby obfuscating where P1 is to be found.

Figure 7A:
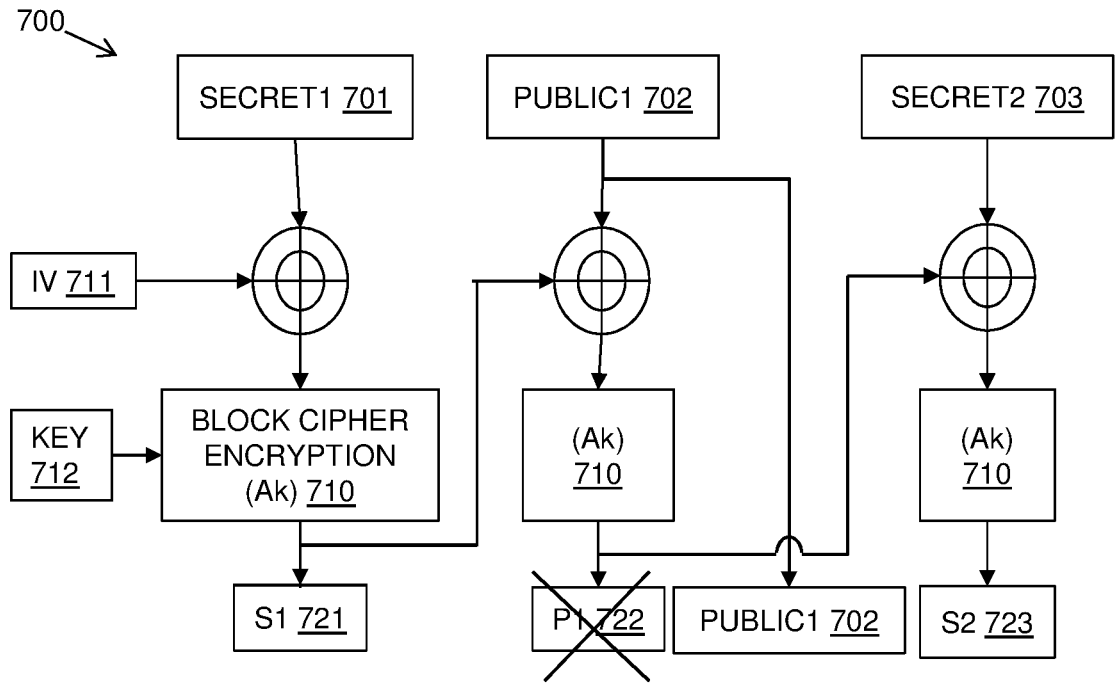
FIGS. 7A and 7B are schematic diagrams illustrating further details of aspects of an example embodiment of a method in accordance with the present disclosure.
Figure 7B:
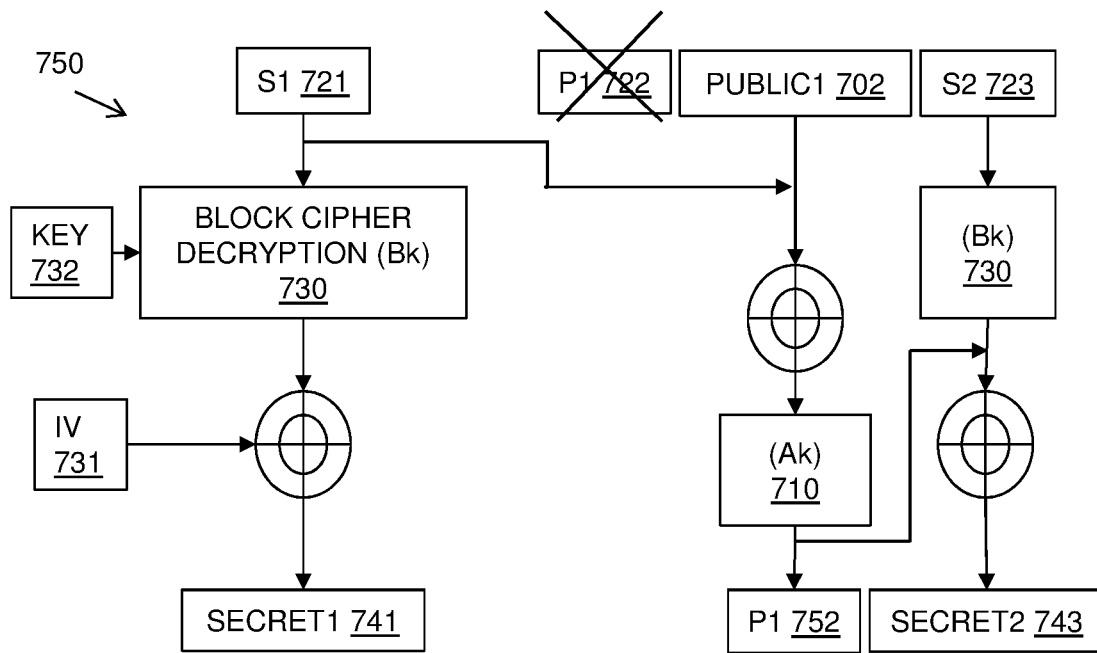

Referring to FIGS. 7A and 7B, an alternative example embodiment of a block cipher method is illustrated. In this example, P1 is not transmitted in the stream, but only PUBLIC1. However, P1 is required in the decryption, so it is recovered from PUBLIC1.

FIG. 7A illustrates the example encryption method 700 using a block cipher equivalent to FIG. 6A with the initial content stream=<SECRET1 SECRET2>, with metadata PUBLIC1 and with the method interleaving the metadata PUBLIC1 in the content stream to make <SECRET1 (701) PUBLIC1 (702) SECRET2 (703)>.

Using a block cipher encryption 710 (Ak), with an Initialization Vector 711 (IV) and key 712. <SECRET1 (701) PUBLIC1 (702) SECRET2 (703)> is encrypted to <S1 (721) P1 (722) S2 (723)> as in FIG. 6A.

In this embodiment, the encrypted metadata P1 722 is replaced by the readable metadata PUBLIC1 702 to create a transmitted stream <S1 (721) PUBLIC1 (702) S2 (723)>.

FIG. 7B illustrates the example decryption method 750 using a block cipher. The transmitted stream <S1 (721) PUBLIC1 (702) S2 (723)> is received.

The transmitted stream is decrypted using a block cipher decryption 730 (Bk), with an Initialization Vector 731 (IV) and key 732.

S1 721 is decrypted to SECRET1 741 (based on IV and S1). The encrypted metadata P1 722 is necessary to decrypt the secret data S2 723. However, in this embodiment, P1 722 is not transmitted. Instead it is recovered by encrypting PUBLIC1 702 to obtain P1 752 with the encryption 710 based on S1 721 and PUBLIC1 702 (P1=Ak (PUBLIC1 $\oplus$ S1)). The obtained P1 752 can then be used to decrypt S2 723 to SECRET2 743.

The described method and system meet ISP requirements of metadata visibility, without compromising end-to-end maintained security integrity.

Blocks or sections of data can only be decrypted if the unencrypted public metadata at least (if not the encrypted metadata as well) is present and intact. None of the encrypted digital stream can be decrypted if the public metadata has been tampered with.

The technical solution ensures that the public metadata indicating details of the content, such as the content source, is used in order to decrypt the encrypted digital material.

Figure 8A:
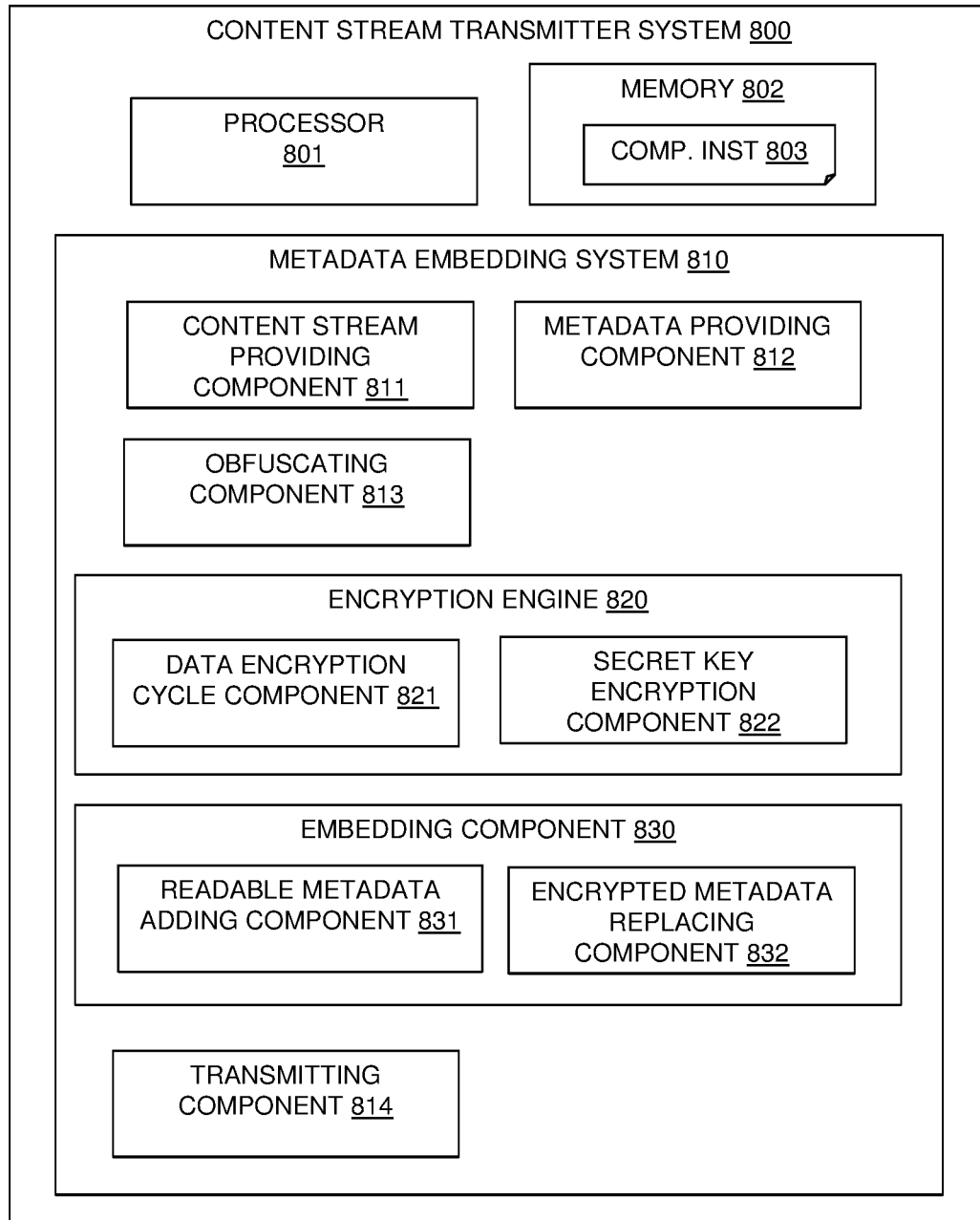
FIGS. 8A and 8B are block diagrams of example embodiments of encryption and decryption aspects of a system in accordance with the present disclosure.
Figure 8B:
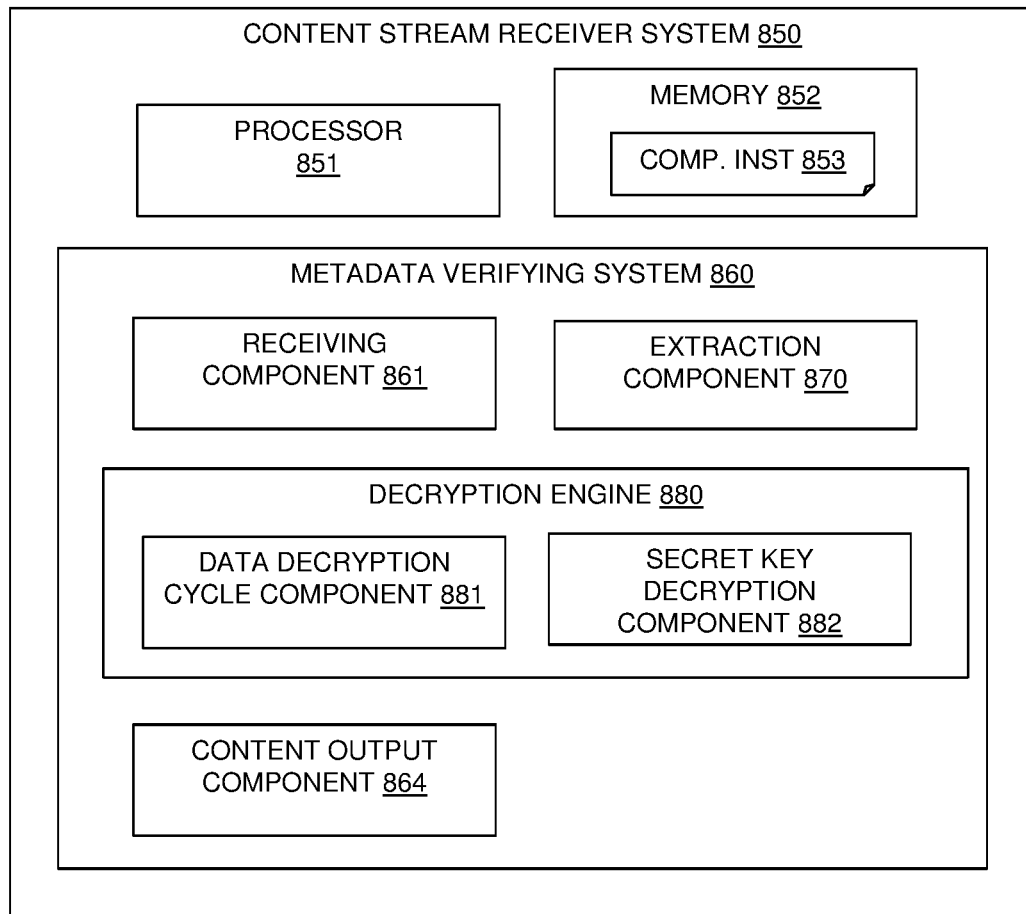

Referring to FIGS. 8A and 8B, example embodiments of the described system are shown at a content stream transmitter system 800 and a content stream receiver system 850.

The content stream transmitter system 800 and the content stream receiver system 850 may each be computing devices that include at least one processor 801, 851, a hardware module, or a circuit for executing the functions of the described components which may be software units executing on the at least one processor. Multiple processors running parallel processing threads may be provided enabling parallel processing of some or all of the functions of the components. Memory 802, 852 may be configured to provide computer instructions 803, 853 to the at least one processor 801, 851 to carry out the functionality of the components.

The content stream transmitter system 800 and the content stream receiver system 850 may be remote from each other with data content streamed between the systems 800, 850 via a network.

Referring to FIG. 8A, the content stream transmitter system 800 may include a metadata embedding system 810 providing the described functionality. The metadata embedding system 810 may be incorporated into an encryption system or may be a separate system that embeds the metadata into already encrypted content.

The metadata embedding system 810 may include a content stream providing component 811 for providing a content stream. The content stream providing component 811 may provide streaming content that is processed by the metadata embedding system 810 as it arrives. The content stream providing component 811 may provide an already encrypted content stream capable of further encryption.

The metadata embedding system 810 may include a metadata providing component 812 for providing metadata relating to the content stream. The metadata may be provided in readable form, which is human readable plain text or images or is computer readable.

The metadata embedding system 810 may include an obfuscation component 813 for obfuscation of the metadata by adjusting a length of the metadata by adding random characters to the metadata.

The metadata embedding system 810 may include an encryption engine 820 for encrypting the content stream with the encryption dependent on at least some of the metadata provided by the metadata providing component 812. The encryption engine 820 may use alternative forms of encryption providing different embodiments of the described system.

In one embodiment, the encryption engine 820 may include a data encryption cycle component 821 for encrypting the content stream using the metadata in a data encryption cycle. The data encryption cycle component 821 may use a block cipher in which encryption of a section of data is dependent on a previous section of data and the content stream is divided into sections and at least some of the metadata is included in sections interspersed in the sections of the content stream.

In another embodiment, the encryption engine 820 may include a secret key encryption component 822 for encrypting the content stream using at least some of the metadata in combination with a secret encryption key.

The metadata embedding system 810 may include an embedding component 830 for embedding the metadata in readable form in an encrypted content stream generated by the encryption engine. The embedding component 830 may intersperse the readable metadata in an encrypted content stream for transmission. The readable metadata may be provided in one or more sections that are repeated, each section including descriptive information relating to the content stream.

The embedding component 830 may include a readable metadata adding component 831 that may add the readable metadata to an encrypted content stream in addition to any encrypted metadata in the encrypted content stream.

The embedding component 830 may include an encrypted metadata replacing component 832 for replacing encrypted metadata in the encrypted content stream with the readable metadata for transmission.

The metadata embedding system 810 may include a transmitting component 814 for transmitting the encrypted content stream together with the metadata in readable form such that the metadata is readable during transmission of the encrypted content stream and the readable metadata is available for use in decryption of the content stream.

Referring to FIG. 8B, the content stream receiver system 850 may include a metadata verifying system 860 providing the described functionality. The metadata verifying system 860 may be incorporated into a decryption system or may be a separate system that verifies the metadata before sending still encrypted content to a decryption system.

The metadata verifying system 860 may include a receiving component 861 for receiving a transmitted encrypted content stream together with metadata in readable form enabling reading of the metadata during transmission.

The metadata verifying system 860 may include an extraction component 870 and a decryption engine 880. The extraction component 870 is for extracting the metadata in readable form for use in the decryption engine 880. The decryption engine 880 is for decrypting the received encrypted content stream with the decryption being dependent on at least some of the readable form of the metadata.

The decryption engine 880 may decrypting the content stream with the decryption dependent on at least some of the readable form of the metadata includes using at least some of the readable form of the metadata in a data decryption cycle.

The decryption engine 880 may use alternative forms of decryption providing different embodiments of the described system.

In one embodiment, the decryption engine 880 may include a data decryption cycle component 881 corresponding to the data encryption cycle component 821 of an encryption engine 820 of a corresponding content stream transmitter system 800.

The data decryption cycle component 881 is for decrypting the received content stream where a data encryption cycle used the metadata during encryption. In one version, the data decryption cycle component 881 may use at least some of the extracted readable form of the metadata in decryption of the data encryption cycle. In another version, the data decryption cycle component 881 may use metadata encrypted in the encrypted content stream in a data decryption cycle and verifying resultant decrypted metadata with at least some of the readable form of the metadata.

The data decryption cycle component 881 may decipher a block cipher in which encryption of a section of data is dependent on a previous section of data and the content stream is divided into sections and at least some of the metadata is included in sections interspersed in the sections of the content stream.

In another embodiment, the decryption engine 880 may include a secret key decryption component 882 for decrypting the content stream using at least some of the metadata in combination with a secret decryption key.

The metadata verifying system 860 may include a content output component 864 for providing a content stream of content with verified metadata. The content stream of content with verified metadata may still be encrypted for further decryption by another decryption system.

Figure 9:
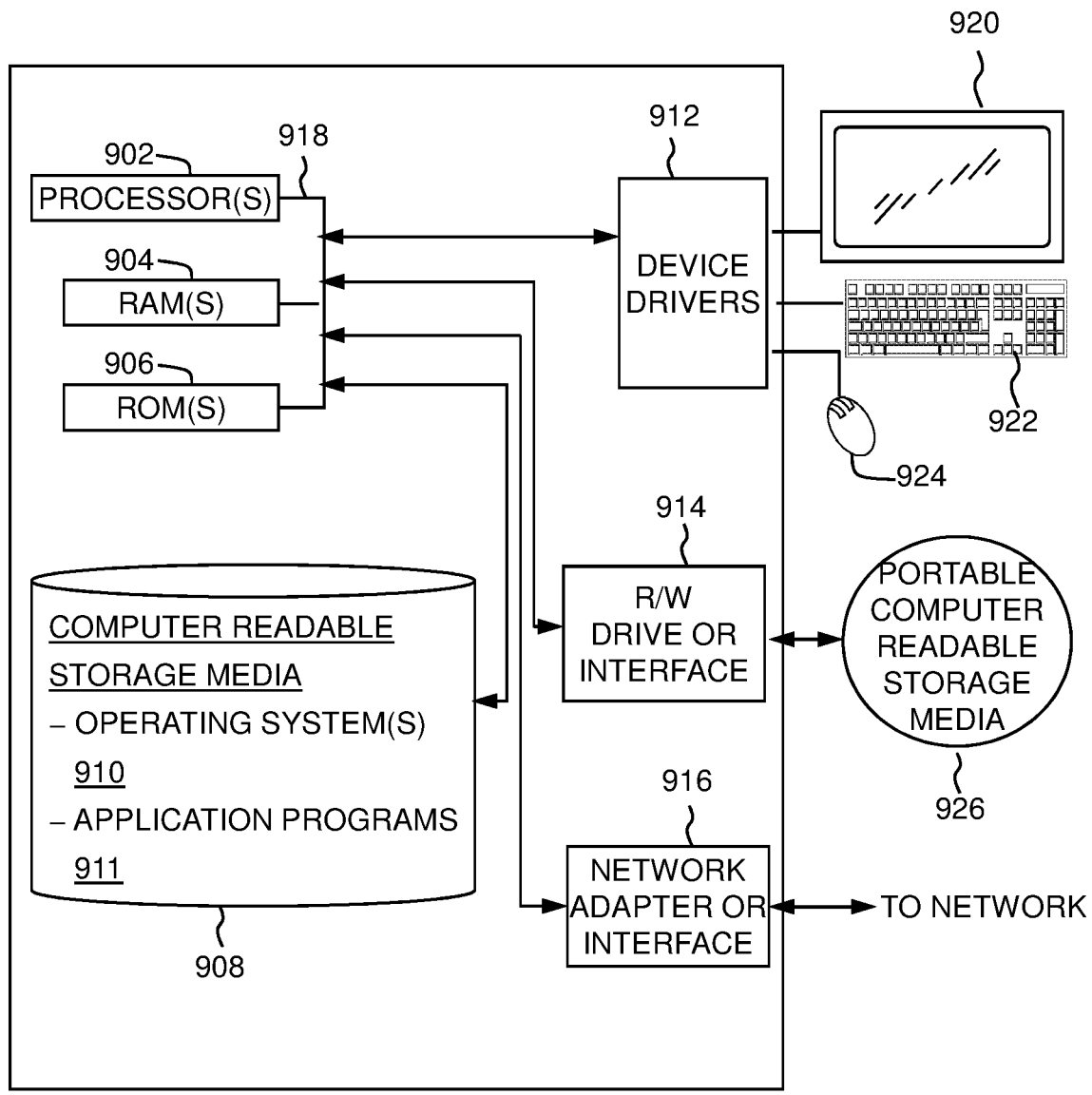
FIG. 9 is a block diagram of an embodiment of a computer system or cloud server in which the present disclosure may be implemented.

FIG. 9 depicts a block diagram of components of the computing devices of the content stream transmitter system 800 and content stream receiver system 850 of FIGS. 8A and 8B, in accordance with an embodiment of the present disclosure. It should be appreciated that FIG. 9 provides only an illustration of one implementation and does not imply any limitations with regard to the environments in which different embodiments may be implemented. Many modifications to the depicted environment may be made.

Computing device can include one or more processors 902, one or more computer-readable RAMs 904, one or more computer-readable ROMs 906, one or more computer readable storage media 908, device drivers 912, read/write drive or interface 914, and network adapter or interface 916, all interconnected over a communications fabric 918. Communications fabric 918 can be implemented with any architecture designed for passing data and/or control information between processors (such as microprocessors, communications and network processors, etc.), system memory, peripheral devices, and any other hardware components within the system.

One or more operating systems 910, and application programs 911, such as encryption and decryption engines are stored on one or more of the computer readable storage media 908 for execution by one or more of the processors 902 via one or more of the respective RAMs 904 (which typically include cache memory). In the illustrated embodiment, each of the computer readable storage media 908 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the present disclosure.

Computing device can also include a R/W drive or interface 914 to read from and write to one or more portable computer readable storage media 926. Application programs 911 on the computing device can be stored on one or more of the portable computer readable storage media 926, read via the respective R/W drive or interface 914 and loaded into the respective computer readable storage media 908.

Computing device can also include a network adapter or interface 916, such as a TCP/IP adapter card or wireless communication adapter. Application programs 911 on computing device can be downloaded to the computing device from an external computer or external storage device via a network (for example, the Internet, a local area network or other wide area networks or wireless networks) and network adapter or interface 916. From the network adapter or interface 916, the programs may be loaded into the computer readable storage media 908. The network may comprise copper wires, optical fibers, wireless transmission, routers, firewalls, switches, gateway computers and edge servers.

Computing device can also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914, and network adapter or interface 916 can comprise hardware and software stored in computer readable storage media 908 and/or ROM 906.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
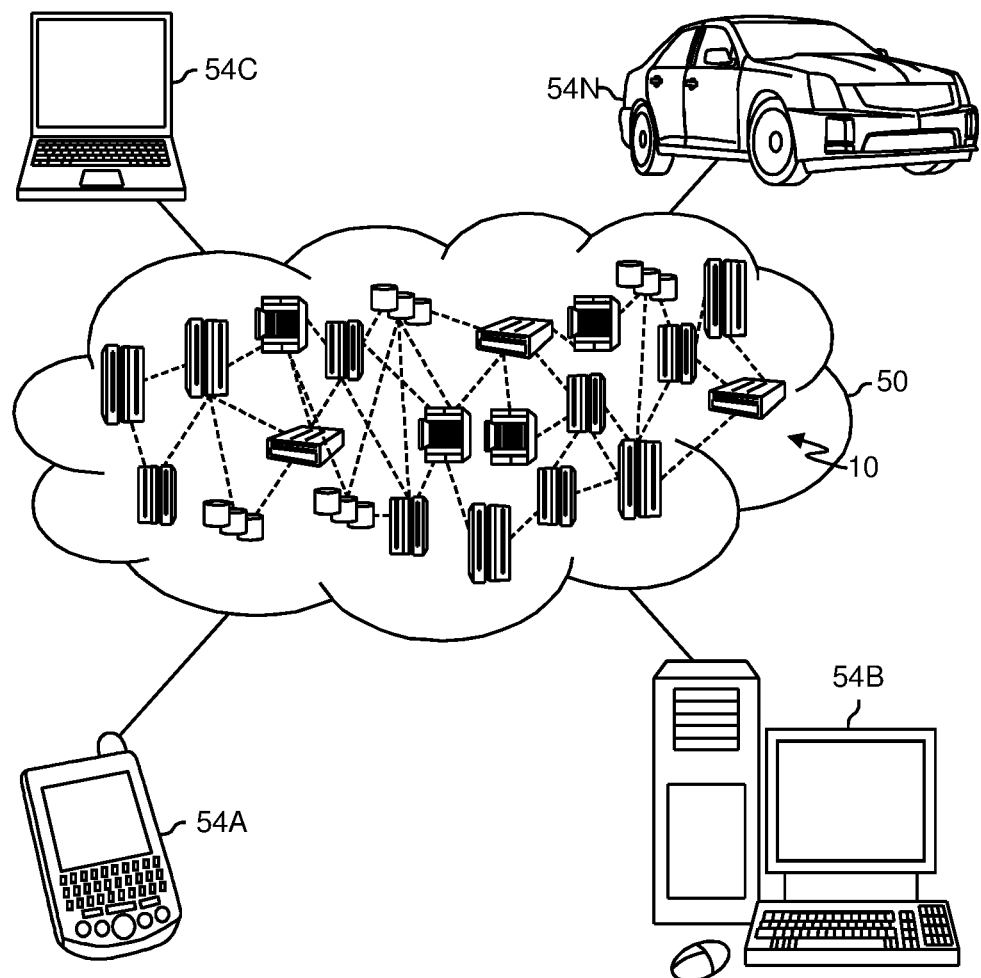
FIG. 10 is a schematic diagram of a cloud computing environment in which the present disclosure may be implemented.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 11:
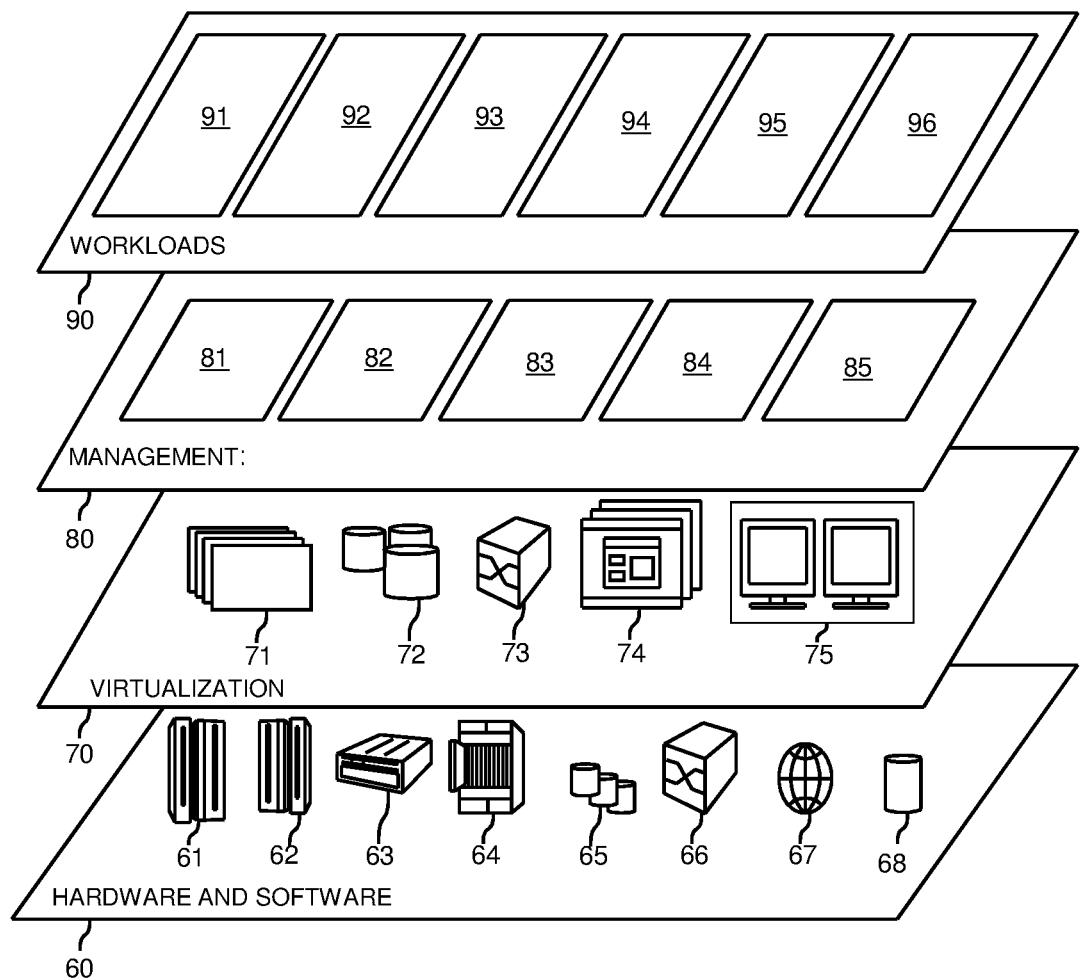
FIG. 11 is a diagram of abstraction model layers of a cloud computing environment in which the present disclosure may be implemented.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and streaming content encryption and decryption processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A system for streaming digital content, comprising:
a processor and a memory configured to provide computer program instructions to the processor to execute the function of components including:
a content stream providing component providing a content stream and a metadata providing component for providing metadata relating to the content stream;
an encryption engine for encrypting the content stream with an encryption dependent on at least some of the metadata to provide an encrypted content stream, wherein the at least some of the metadata includes descriptive information relating to the content stream; and
an embedding component for embedding the metadata in readable form in the encrypted content stream; and
a transmitting component for transmitting the encrypted content stream together with the metadata in readable form such that the metadata is readable during transmission of the encrypted content stream and the readable metadata necessary for use in decryption of the encrypted content stream is provided.

2. The system of claim 1, wherein the system is in network communication with a receiving system comprising:
an extraction component for extracting the metadata in readable form to provide extracted metadata for use in a decryption engine; and
a decryption engine for decrypting the encrypted content stream with a decryption being dependent on at least some of the readable form of the metadata.

3. The system of claim 1, wherein embedding the metadata includes interspersing the readable metadata in multiple sections in the encrypted content stream, each section including descriptive information relating to the content stream.

4. The system of claim 1, wherein the encrypting the content stream with an encryption dependent on at least some of the metadata includes using the metadata in a data encryption cycle.

5. The system of claim 1, wherein the encrypting the content stream with an encryption dependent on at least some of the metadata includes using at least some of the metadata in combination with a secret encryption key.

6. The system of claim 4, wherein the data encryption cycle is a block cipher in which encryption of a section of data is dependent on a previous section of data and wherein the content stream is divided into sections and at least some of the metadata is included in sections interspersed in the sections of the content stream.

7. The system of claim 6, further comprising an obfuscation component for obfuscating the metadata in the content stream.

8. The system of claim 5, wherein the data encryption cycle generates encrypted metadata that is transmitted in addition to the readable metadata.

9. The system of claim 5, wherein the data encryption cycle generates encrypted metadata that is replaced by the readable metadata for transmission.

10. The system of claim 1, wherein providing a content stream provides an already encrypted content stream capable of further encryption.

11. The system of claim 1, wherein the descriptive information relating to the content stream includes content provider information, content description, and licensing information.

* * * * *